United States Patent [19]

Muraoka et al.

[11] Patent Number: 4,745,503
[45] Date of Patent: May 17, 1988

[54] LINEAR ACTUATOR FOR MOVING A RECORDING/READING HEAD IN AN ACCESS DIRECTION RELATIVE TO A RECORDING DISC

[75] Inventors: Takao Muraoka, Yokohama; Toshihiro Sugaya, Tokyo, both of Japan

[73] Assignee: Kabushiki Kaisha Toshiba, Kawasaki, Japan

[21] Appl. No.: 832,233

[22] Filed: Feb. 24, 1986

[30] Foreign Application Priority Data

Feb. 25, 1985 [JP] Japan .................................. 60-35931
Feb. 25, 1985 [JP] Japan .................................. 60-35932

[51] Int. Cl.$^4$ .......................... G11B 5/55; G11B 21/08
[52] U.S. Cl. ........................................ 360/106; 310/13
[58] Field of Search ...................... 310/12–14, 310/27; 318/135; 360/104–106

[56] References Cited

U.S. PATENT DOCUMENTS

| | | | |
|---|---|---|---|
| 3,587,075 | 6/1971 | Brown et al. | 360/106 |
| 4,072,101 | 2/1978 | Garcia et al. | 310/13 X |
| 4,220,899 | 9/1980 | Von Per Heide | 318/135 |
| 4,305,105 | 12/1981 | Ho et al. | 360/106 |
| 4,393,425 | 7/1983 | Wright | 360/105 |
| 4,408,138 | 10/1983 | Okamoto | 310/12 |
| 4,415,941 | 11/1983 | Gibeau et al. | 360/106 |
| 4,427,905 | 1/1984 | Sutton | 310/13 |
| 4,613,962 | 9/1986 | Inoue et al. | 318/135 X |
| 4,631,431 | 12/1986 | Viskochil | 310/13 |

FOREIGN PATENT DOCUMENTS

| | | | |
|---|---|---|---|
| 0139086 | 5/1985 | European Pat. Off. | 360/106 |
| 58-211363 | 12/1983 | Japan | 360/104 |
| 60-118050 | 6/1985 | Japan | 310/12 |

OTHER PUBLICATIONS

Guzman et al., "Voice Coil Motor," IBM Tech. Disc. Bull., vol. 20, No. 5, Oct. 1977.

Primary Examiner—Stuart N. Hecker
Assistant Examiner—Benjamin E. Urcia
Attorney, Agent, or Firm—Oblon, Fisher, Spivak, McClelland & Maier

[57] ABSTRACT

A linear actuator has a flat box-like carriage movable along an access direction of a disk as a recording medium, a motor coil housed and fixed in the carriage, and a permanent magnet arrangement housed and fixed in the carriage to apply a magnetic field to the motor coil. The permanent magnet arrangement includes an E-shaped yoke member with a central portion extending along the access direction and inserted in the motor coil, a pair of outer portions arranged along two sides of the central portion, and permanent magnets arranged on opposite surfaces of the outer and central portions. The yoke member is arranged in the carriage to be parallel to the disk.

9 Claims, 5 Drawing Sheets

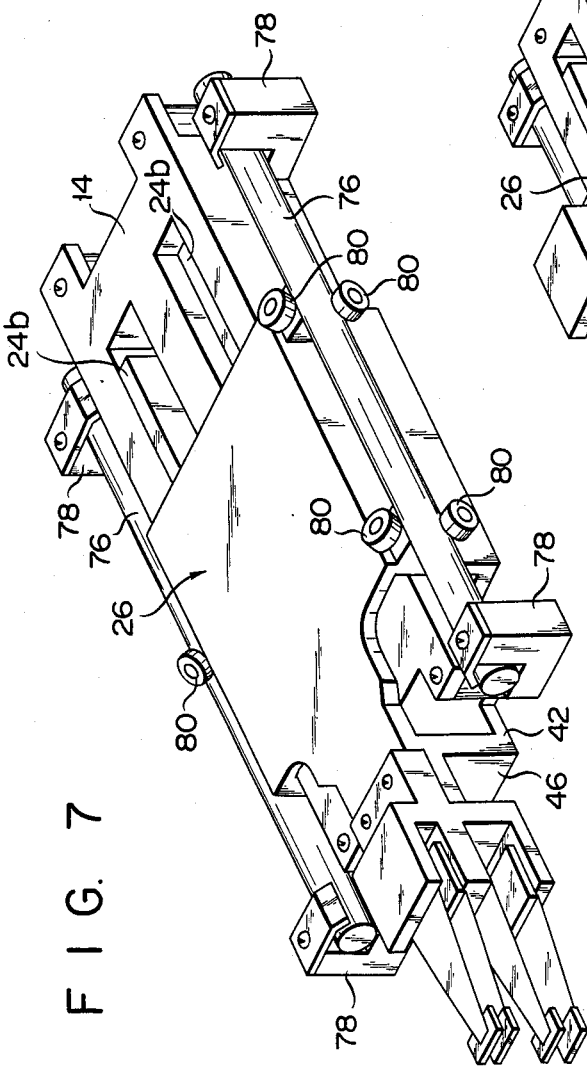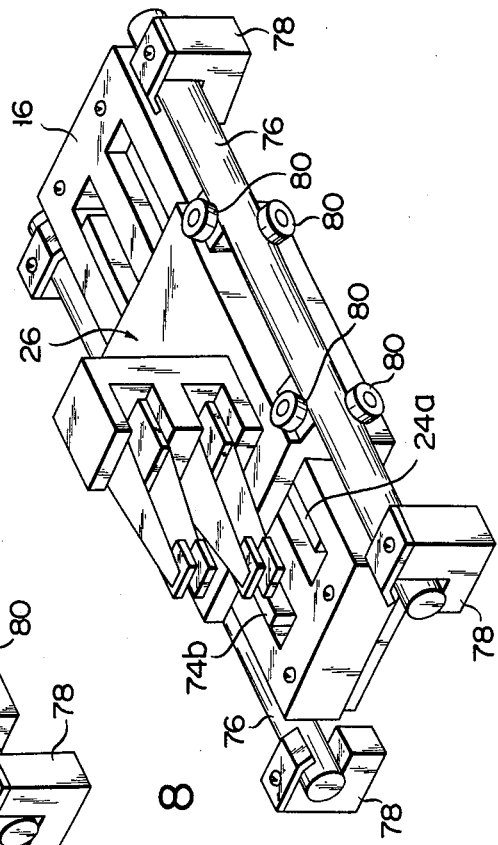

LINEAR ACTUATOR FOR MOVING A RECORDING/READING HEAD IN AN ACCESS DIRECTION RELATIVE TO A RECORDING DISC

BACKGROUND OF THE INVENTION

The present invention relates to a linear actuator used for driving a head, particularly a recording/reading or magnetic head in a disk drive apparatus.

A conventional linear actuator of this type is disclosed in Japanese Patent Publication No. 59-501135. This actuator has a permanent magnet arrangement for driving a carriage with a motor coil. The permanent magnet arrangement defines a magnetic field along a direction perpendicular to a plane including a magnetic disk. The permanent magnet arrangement requires a yoke extending along a direction perpendicular to the surface of the magnetic disk. For this reason, the above linear actuator has a large height in the direction perpendicular to the surface of the magnetic disk. As a result, a flat-profile arrangement of the disk drive apparatus cannot be obtained.

SUMMARY OF THE INVENTION

It is an object of the present invention to provide a linear actuator suitable for a flat-profile disk drive apparatus.

In order to achieve the above object of the present invention, there is provided a linear actuator for a disk drive apparatus for rotating a disk as a recording medium, comprising: a carriage; guiding means for guiding the carriage to move toward or away from a disk along an access direction which is parallel to the disk; a motor coil fixed to the carriage and adapted to be energized; and a magnetic field applying mechanism for applying a magnetic field to the motor coil, the magnetic field applying assembly including a yoke member, the yoke member being provided with a central portion inserted in the motor coil and extending along the access direction, a pair of outer portions which are arranged to be spaced apart by a predetermined gap from two sides of the central portion on a plane parallel to the plane including the disk and which extend parallel to the central portion, and a pair of connecting portions for magnetically connecting end portions of the central portion and the pair of outer portions, and generating means, fixed to the yoke member, for generating magnetic fields between the central portion and the pair of outer portions such that the polarities thereof are opposite to each other.

According to the linear actuator of the present invention, the yoke member is arranged on the plane parallel to the disk. The height of the magnetic field applying assembly including the yoke member is smaller than the known linear actuator in the direction perpendicular to the disk. As a result, when the linear actuator according to the present invention is applied to a disk drive apparatus, the disk drive apparatus can have a lower profile.

The above and other objects, features and advantages of the present invention will be apparent from the following detailed description in conjunction with the accompanying drawings.

BRIEF DESCRIPTION OF THE DRAWINGS

FIGS. 5 to 9 are perspective views showing modifications of the linear actuator in FIG. 1.

DETAILED DESCRIPTION OF THE PREFERRED EMBODIMENTS

Figure 1:
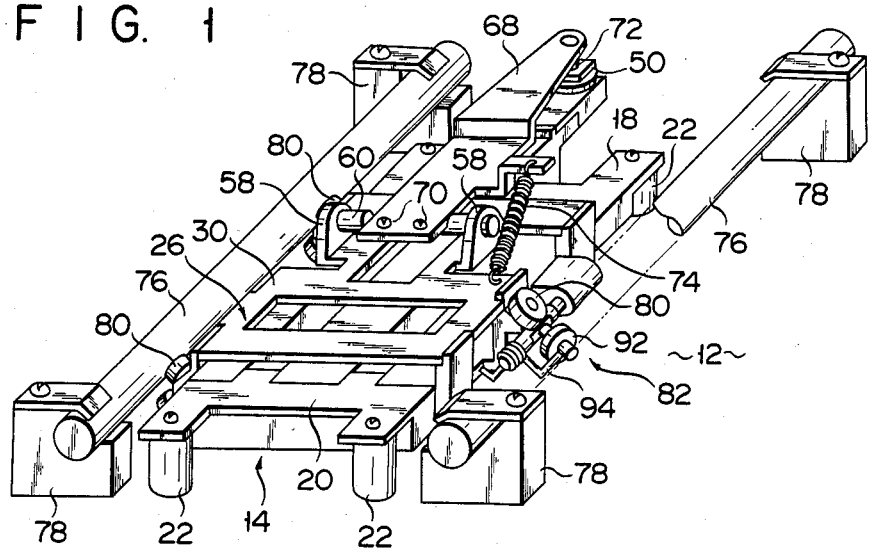
FIG. 1 is a perspective view of a linear actuator according to an embodiment of the present invention.
Figure 2:
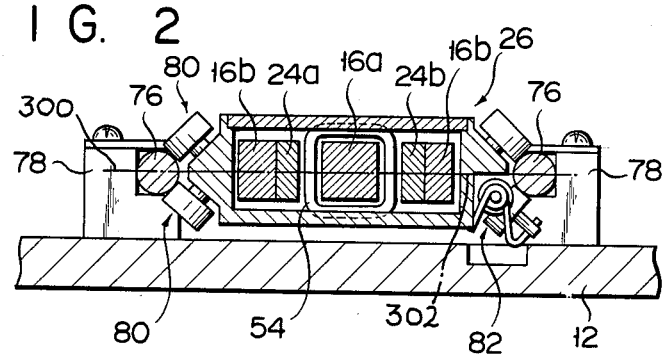
FIG. 2 is a sectional view of the linear actuator in FIG. 1.
Figure 3:
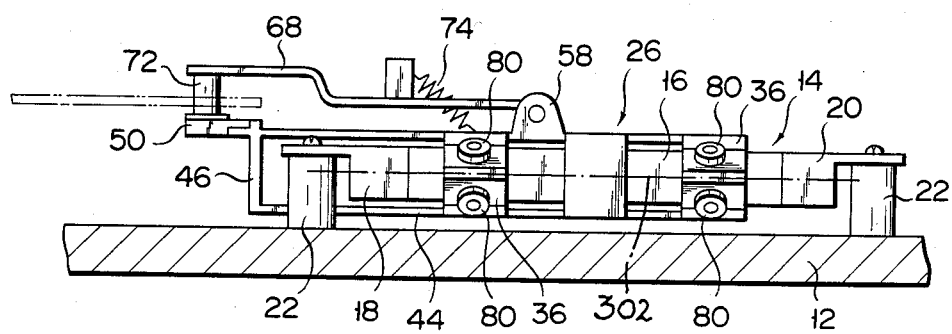
FIG. 3 is a side view of the linear actuator in FIG. 1.
Figure 4:
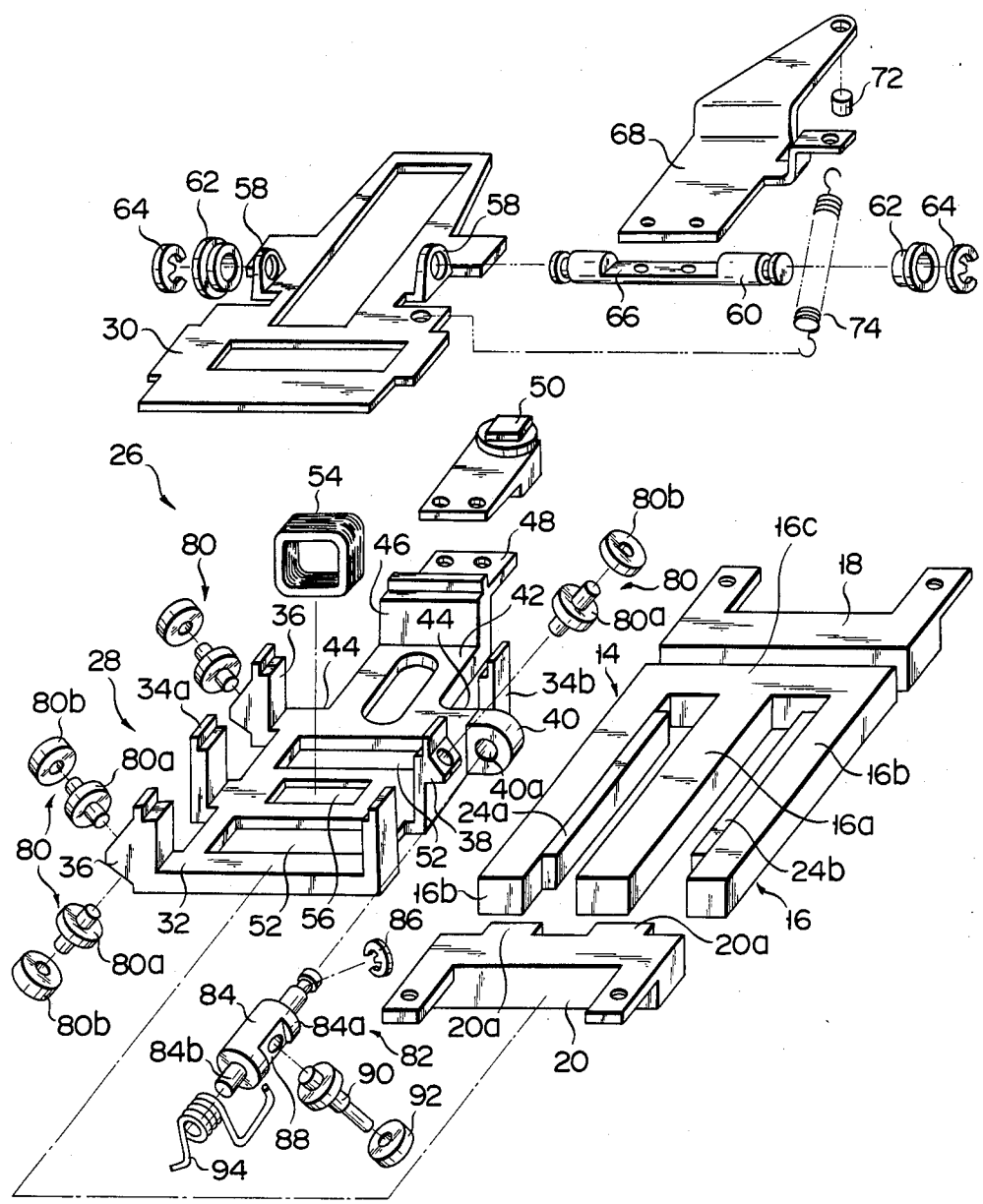
FIG. 4 is an exploded perspective view of the linear actuator in FIG 1.

A linear actuator for a disk drive apparatus has base plate 12 as shown in FIG. 1. Magnetic field applying assembly 14 is fixed on plate 12. Assembly 14 is best illustrated in FIG. 4. Assembly 14 has E-shaped yoke member 16 arranged parallel to a magnetic disk (indicated by the alternative long and two short dashed line in FIG. 3). Member 16 has central portion 16a, a pair of outer portions 16b and connecting portions 16c. Portion 16a has a rectangular cross section and extends along the access direction for a magnetic disk. Portions 16b have a rectangular cross section, are parallel to portion 16a, and are separated from the two sides of portion 16a by a predetermined gap. Portions 16c connect one ends of portions 16b and 16a. One end (i.e., portion 16c) of yoke member 16 which is adjacent to the magnetic disk is connected by means of screws to first mounting portion 18. The other ends of member 16 is connected by means of screws to second mounting portion 20 having the same configuration as portion 18. Portion 20 is made of the same magnetic material as that of member 16. A pair of projections 20a are formed on portion 20 to fit between the other ends of each of portions 16b and the other end of portion 16a, respectively, when portion 20 is mounted on member 16. The other ends of member 16, i.e., the free ends of portions 16b and 16a are magnetically coupled to each other through projections 20a on portion 20. Portions 18 and 20 are fixed to base 12 through two pairs of legs 22, respectively, as shown in FIGS. 1 and 3. Member 14 and portions 18 and 20 are held in a floating state and are spaced apart by a predetermined distance from plate 12, as shown in FIGS. 2 and 3. Permanent magnets 24a and 24b are fixed to side surfaces of portions 16b which are opposite to portion 16a in member 16. Magnets 24a and 24b are magnetic plates extending along the longitudinal direction of portion 16b, and are magnetized along a direction perpendicular to its longitudinal direction. Polarities of the surfaces of magnets 24a and 24b opposite to portion 16a are different. Therefore, magnetic fields with opposite polarities are formed between member 16 and portions 16b.

A flat box-like carriage 26 is arranged to surround assembly 14. Carriage 26 can be moved toward or away from the magnetic disk through a guide mechanism along the access direction. Carriage 26 will be described prior to the guide mechanism.

As shown in FIG. 4, carriage 26 mainly has body 28 and upper plate 30. Body 28 has lower wall 32 and side walls 34a and 34b arranged at two sides extending from wall 32 along the access direction. Each of walls 34a and 34b is divided by notches into three side wall portions. In wall 34a, projections 36 extend from the outer surfaces of the end wall portions excluding the central wall portion. Each projection 36 has upper and lower side surfaces inclined at about 45 degrees, as shown in FIG. 4. Blind holes are formed in the inclined upper and lower side surfaces in directions perpendicular thereto. In wall 34b, projection 38 is formed on the outer surface of only the central side wall portion. Projection 38 corresponds to an upper half portion of each projection 36. A blind hole is formed in projection 38 in a direction perpendicular to the inclined surface thereof. In wall 34b, bracket 40 extends outward from body 28 between the side wall portion at the magnetic disk side and the central side wall portion. Bracket 40 is located below projection 38 and has hole 40a extending along the access direction.

Head arm 42 is narrower than wall 32 and extends integrally with the end thereof adjacent to the magnetic disk along the access direction. A pair of steps 44 are formed between arm 42 and wall 32, as shown in FIG. 4. End wall 46 extends vertically upward at the front end of arm 42. Mounting base 48 is integrally formed with wall 46 and extends toward the magnetic disk. Magnetic head 50 is mounted on base 48.

A plurality of through holes 52 are formed in wall 32 of body 28 and arm 42 to decrease the weight of carriage 26. Depression 56 is formed at the central portion of wall 32 to mount motor coil 54 therein. More particularly, part of coil 54 is fitted in depression 56, so that coil 54 can be fixed with respect to wall 32, i.e., body 28. As is apparent from FIG. 2, portion 16a of member 16 is inserted in coil 54, and coil 54 is mounted in depression 56. Upon movement of body 28, coil 54 is moved along portion 16a of member 16.

Plate 30 has substantially the same shape as wall 32 of body 28 and arm 42. Plate 30 is supported by steps formed at the upper portions of side wall portions and wall 46 in body 28 to close the upper side of body 28. A pair of brackets 58 are formed on the upper surface of plate 30 and are opposite each other along a direction perpendicular to the access direction. Ends of pivot shaft 60 are rotatably supported by brackets 58 and extend outside brackets 58. The axial movement of shaft 60 is hindered by means of collars 62 and E-rings 64. Flat surface 66 is formed at the central portion of shaft 60 along the axial direction thereof. A proximal end of pad arm 68 extending along the access direction is fixed by screws 70 (FIG. 1) to surface 66. A step is formed at middle portion of the arm 68 in the access direction, a distal end of arm 68 extends from the step. The width of the distal end is decreased toward the magnetic disk. Pad 72 is mounted on the lower surface of the distal end of arm 68. A tension coil spring 74 is arranged between arm 72 and plate 30. Spring 74 biases arm 68 downward, so that pad 72 of arm 68 can urge the magnetic disk toward head 50.

Carriage 26 with the arrangement described above is guided through the guide mechanism along the access direction. The guide mechanism will be described below.

The guide mechanism has a pair of stationary rods 76 which are arranged at the both sides of carriage 26, as shown in FIGS. 1 and 2. Rods 76 have a circular sectional shape and are arranged parallel to each other along the access direction and close to longitudinal central axes of the side walls 34a and 34b of the carriage. The top and bottom portions of the coil 54 are substantially symmetrical with a central plane 300 (FIG. 2) including the longitudinal central axes 302 of the side walls. Both ends of rods 76 are supported by corresponding supports 78 fixed on base 12.

A plurality of rotary bearings 80 are mounted on the two side walls of carriage 26 and are in rolling contact with rods 76. In wall 34a of body 28, bearings 80 are mounted on the upper and lower inclined side walls of projections 36. Each bearing 80 has fixed shaft 80a, vertically extending from the inclined surface, and roller 80b, rotatably mounted on shaft 80a and in rolling contact with the corresponding rod 76. The axes of the pair of bearings 80 mounted on each projection 36 are perpendicular to each other. In wall 34b, bearing 80 is mounted on the inclined surface of projection 38.

Biased rotary bearing 82 is mounted on side wall 34b at a position below projection 38 so as to urge the corresponding rod 76. More particularly, bearing 82 has rotating shaft 84, one end of which is inserted in hole 40a of bracket 40. One end of shaft 84 projects from bracket 40, and E-ring 86 is mounted on its projected end. Therefore, E-ring 86 prevents shaft 84 from being separated from bracket 40. Large- and small-diameter portions 84a and 84b are sequentially formed at the other end of shaft 84. Flat surface 88 is formed in portion 84a. Fixed shaft 90 extends from surface 88. Roller 92 is rotatably mounted on shaft 90 and is in rolling contact with rod 76. It should be noted that shaft 90 extends from roller 92. Torsion coil spring 94 is mounted on portion 84b of shaft 84. As shown in FIG. 2, one end of spring 94 is engaged with the lower surface of body 28 at carriage 26. The other end of spring 94 is engaged with the distal end of shaft 90 which extends from roller 92. With bearing 82 described above, shaft 84 is biased by spring 94 counterclockwise, as shown in FIG. 4. As a result, roller 92 is urged against one rod 76. Bearing 80 for each projection 36 receives a reaction force generated by the biasing force of bearing 82. The reaction force acts on the other rod 76.

The operation of the linear actuator described above will be described hereinafter. When coil 54 is energized, an electromagnetic force is generated in one access direction, i.e., the direction toward the magnetic disk and is applied to coil 54. Upon generation of the electromagnetic force, coil 54, i.e., carriage 26 is moved and guided along the pair of rods 76. However, when coil 54 is energized with an opposite polarity, carriage 26 is guided by rods 76 away from the magnetic disk. Therefore, by controlling the energization direction of coil 54, head 50 on carriage 26 can be positioned on any track of the magnetic disk.

The stroke of carriage 26 is regulated by abutment of steps 44 of body 28 in carriage 26 against front legs 22 and abutment of the trailing end of carriage 26 against rear legs 22.

According to the linear actuator of this embodiment, since assembly 14, i.e., member 16 is parallel to the magnetic disk, the height of the linear actuator along the direction perpendicular to the magnetic disk can be decreased. Therefore, when the linear actuator of this embodiment is applied to a disk drive apparatus, a flat profile can be obtained for the apparatus.

In addition, since arrangement 14 is housed in carriage 26, carriage 26 can have a box shape, and its mechanical strength can be improved. Even if carriage 26 is driven, resonance of carriage 26 can be effectively suppressed. As a result, positioning of head 50 on a track of the magnetic disk can be performed with high precision.

According to the linear actuator of this embodiment, bearing 82 is mounted on wall 34b of carriage 26, roller 92 of bearing 82 is urged by the biasing force of spring 94 against rod 76. At the same time, rollers 80b of bearings 80 on wall 34a of carriage 26 are urged against rod 76 by the reaction force generated by spring 94. In other words, the rollers of bearings 80 and 82 are brought into rolling contact with rods 76, thereby causing rods 76 to properly guide carriage 26. Bearing 82 is mounted at the center of wall 34b of carriage 26, so that all rollers of the rotary bearings can be urged by a uniform force against rods 76. The direction of the force generated by spring 94 is not varied, so that all rollers of the rotary bearings are urged against rods 76 with a fixed force. As a result, rods 76 can smoothly guide carriage 26, thereby achieving high actuation speed for the linear actuator.

The present invention is not limited to the particular embodiment described above. Various modifications will now be described with reference to FIGS. 5 to 9. The same reference numerals in the following embodiments denote the same functions and parts in the above embodiment, and a detailed description thereof will be omitted.

Figure 5:
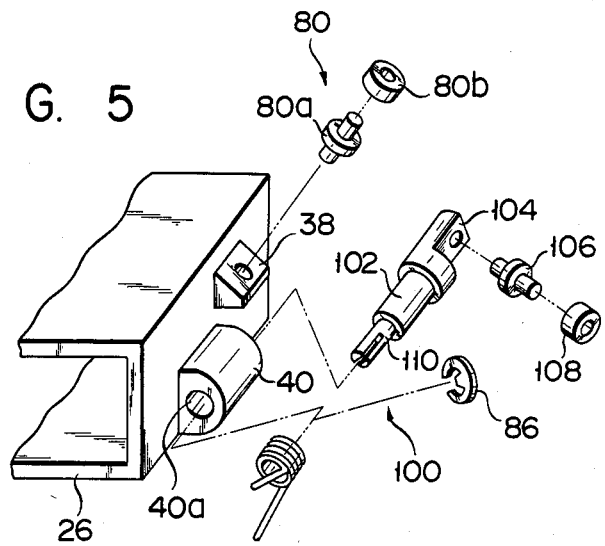

FIG. 5 shows a modification of a biased rotary bearing. Bearing 100 has stepped rotating shaft 102 inserted in bracket 40. Two ends of shaft 102 project from bracket 40. Flat surface 104 is formed on a large-diameter portion of shaft 102 which is located at the side of rotary bearing 80. Fixed shaft 106 is mounted on surface 104. Roller 108 is rotatably mounted on shaft 106. The other end of shaft 102 which projects from bracket 40 defines a small-diameter portion. E-ring 86 is mounted on the small-diameter portion. Notch 110 is formed at the distal end of the small-diameter portion of shaft 102. Torsion coil spring 94 is mounted on the small-diameter portion of shaft 102. One end of spring 94 is engaged with the bottom wall of carriage 26 in the same manner as in the above embodiment. The other end of spring 94 is hooked in notch 110 of shaft 102.

With bearing 100 shown in FIG. 5, the other end of spring 94 need not be hooked at the distal end of shaft 90 extending from roller 92, unlike bearing 82 shown in FIG. 2. Therefore, bearing 100 of FIG. 5 requires a smaller space between carriage 26 and base 12 than that in FIG. 2. When bearing 100 is used, the linear actuator can have further a flat profile.

Figure 6:
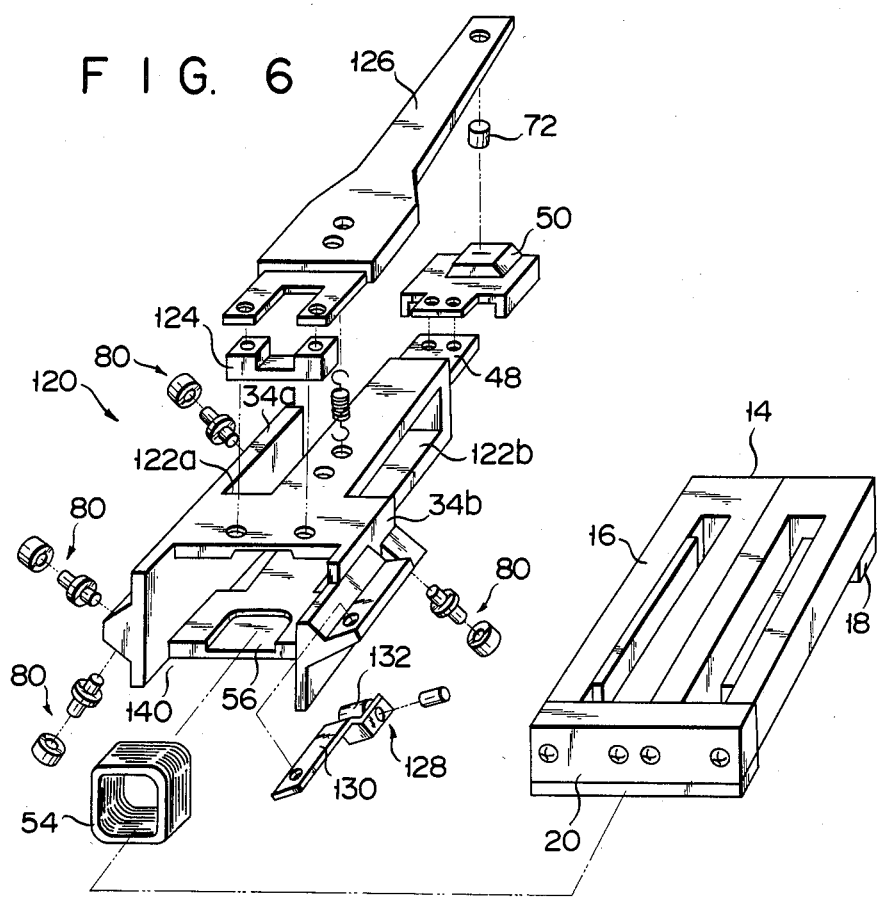

FIG. 6 shows another modification of a linear actuator wherein the body is formed integrally with the upper plate and box-like carriage 120 is used. As shown in FIG. 6, a pair of notches 122a and 122b are formed at the front end portion of carriage 120. Notch 122a is formed to leave the distal end portion of wall 34a. However, notch 122b is formed by notching the distal end portion of wall 34b. In the rear end portion of carriage 120, notch 140 is formed to leave two side walls 34a and 34b. The linear actuator in FIG. 6 also has pad arm 126, consisting of a leaf spring. Arm 126 is mounted on the upper surface of carriage 120 through mounting base 124. In the modification of FIG. 6, biased rotary bearing 128 comprises leaf spring 130, one end of which is fixed to side wall 34b of carriage 120, and roller 132, rotatably mounted on the distal end of spring 130.

Since notches 122a, 122b and 140 are formed in carriage 120 in the linear actuator of the carriage in FIG. 6, the carriage stroke 120 is larger than that of the carriage in FIG. 4. If the same carriage stroke is guaranteed, the length of member 16 in FIG. 6 can be smaller than that in FIG. 4. Therefore, the linear actuator can be made more compact.

The present invention is not limited to the embodiment and modifications described above, i.e., to a linear actuator for use with flexible magnetic disks. For example, if the magnetic head mounted on the linear actuator is replaced with another, the linear actuator can be used for hard magnetic disks. FIG. 7 shows a linear actuator with a floating magnetic head for hard magnetic disks. In this case, a pair of magnetic heads are mounted in the linear actuator at the distal end of the carriage. However, the magnetic heads may be mounted on the upper surface of the carriage, as shown in FIG. 8.

If an optical disk head is used in place of the magnetic head, the linear actuator according to the present invention can also be applied to an optical disk drive apparatus.

Figure 9:
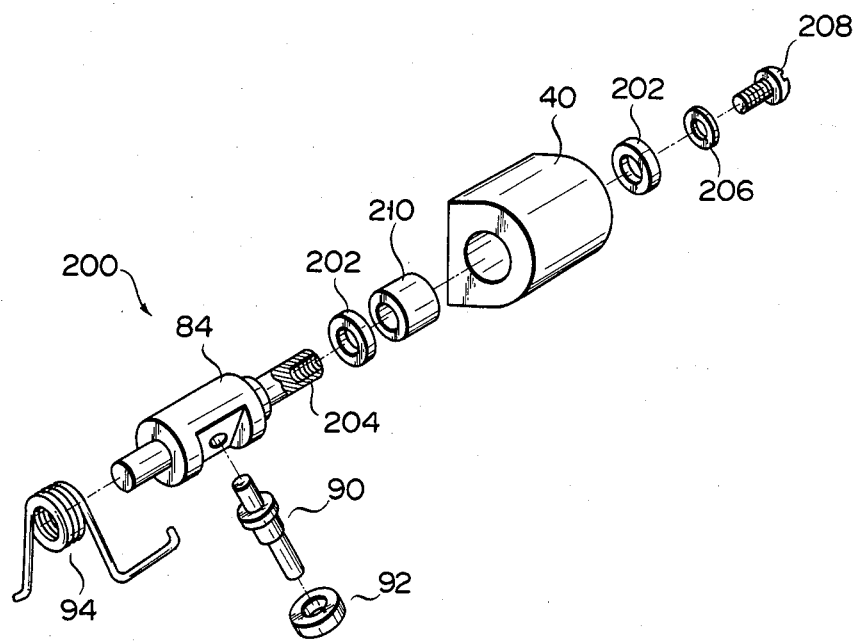

FIG. 9 shows still another modification of the biased rotary bearing according to the invention. Bearing 200 of FIG. 9 is similar in structure to bearing 82 of FIG. 4, but different in that two bearing rings 202 are provided on the sides of bracket 40. Shaft 24 extends from bracket 40. One end of shaft 24 has a screw hole 204 extending in the axial direction of the shaft. Screw 208 extends through washer 206 and is screwed into hole 204. Spacer 210 is provided between bracket 40 and one of bearing rings 202.

Since shaft 84 is supported by two bearing rings 202, it can rotate smoothly. Further, since screw 208 inserted in hole 204 thrusts shaft 84 in the axial direction through washer 206 and bracket 40, roller 92 of bearing 200 can be stably pressed onto rod 76.

What is claimed is:

1. A linear actuator for moving a recording/reading head in an access direction of the recording/reading head relative to a recording disk, comprising:
   a box-like carriage which is flat and hollow, and to which the head is attached, the carriage including a body having a base wall extending parallel to a plane including the disc and a pair of side walls extending transverse to the plane including the disc and parallel to each other in the access direction, said carriage further including a cover supported by said side walls and extending parallel to said base wall;
   guiding means for guiding said carriage along the access direction, said guiding means including a pair of stationary rods which are respectively arranged close to longitudinal central axes of the side walls of said carriage and which extend parallel to each other in the access direction, and bearing means arranged on the side walls of said carriage, for movably supporting said carriage along the stationary rods;
   a motor coil fixed inside said carriage; and
   a magnetic field applying assembly for applying a magnetic field to said motor coil, said magnetic field applying assembly including a yoke member extending through said carriage, the yoke member being provided with a central portion in said motor coil and extending along the access direction, a pair of outer portions which are arranged to be spaced apart by a predetermined gap from two sides of said central portion on said plane parallel to the disk and which extend parallel to said central portion, and a pair of connecting portions for magnetically connecting end portions of said central portion and said pair of outer portions, and generating means, fixed to the yoke member, for generating magnetic fields between the central portion and the pair of outer portions such that the polarities thereof are opposite to each other,
   wherein said base wall and said cover are located on opposite sides of said coil and said yoke.

2. An actuator according to claim 1, wherein said outer portions of said yoke member each have a surface facing said central portion thereof, and said generating means includes plate-like magnets which are fixed to the surfaces of the outer portions of said yoke member and which extend along the central portion of said yoke member.

3. An actuator according to claim 1, wherein said body and cover of said carriage are formed integrally with each other.

4. An actuator according to claim 1 wherein said motor coil is fixed inside said carriage such that top and bottom portions thereof are substantially symmetrical with respect to a plane including said longitudinal central axes of said side walls.

5. An actuator according to claim 1, wherein the bearing means includes pairs of first bearings which are arranged at predetermined intervals on one of the side walls of said carriage, each pair of said first bearings holding therebetween a corresponding one of the stationary rods at a predetermined angle, each of said first bearings including a roller which is brought into rolling contact with the corresponding stationary rod, and the bearing means also including a pair of second bearings which is arranged at a central portion of the other side wall of said carriage along the access direction, said second bearings each having a roller disposed in rolling contact with the other of the stationary rods in the same manner as the first bearings.

6. An actuator according to claim 5, wherein one of the second bearings includes urging means for urging the roller thereof against the other stationary rod.

7. An actuator according to claim 6, wherein the urging means includes a rotating shaft rotatably supported along the other side wall of said carriage, a pin coupled at one end thereof to the rotating shaft and extending in a direction perpendicular to an axis of the rotating shaft, for rotatably supporting the roller of one of said second bearings, and a torsion coil spring for biasing the rotation shaft such that the roller of one of said second bearings is pressed against the other stationary shaft.

8. An actuator according to claim 7, wherein the other end of the pin extends from the roller, one end of the torsion coil spring is hooked to said carriage, and the other end thereof is hooked to the other end of the pin.

9. An actuator according to claim 7, wherein one end of the torsion coil spring is hooked to said carriage, and the other end thereof is hooked to the rotating shaft.

* * * * *